US012158254B1

(12) United States Patent
Yang

(10) Patent No.: US 12,158,254 B1
(45) Date of Patent: Dec. 3, 2024

(54) AUTOMOBILE LED HEADLAMP

(71) Applicant: Kun Yang, Guangzhou (CN)

(72) Inventor: Kun Yang, Guangzhou (CN)

( * ) Notice: Subject to any disclaimer, the term of this patent is extended or adjusted under 35 U.S.C. 154(b) by 0 days.

(21) Appl. No.: 18/368,008

(22) Filed: Sep. 13, 2023

(51) Int. Cl.

| | |
|---|---|
| ***F21S 45/47*** | (2018.01) |
| ***F21S 41/141*** | (2018.01) |
| ***F21S 45/43*** | (2018.01) |
| ***F21V 29/67*** | (2015.01) |
| ***F21V 29/77*** | (2015.01) |

(52) U.S. Cl.
CPC ............. *F21S 45/47* (2018.01); *F21S 41/141* (2018.01); *F21S 45/43* (2018.01); *F21V 29/673* (2015.01); *F21V 29/777* (2015.01)

(58) Field of Classification Search
CPC ...... F21V 29/673; F21V 29/777; F21V 29/71; F21S 45/43; F21S 45/47
See application file for complete search history.

(56) References Cited

U.S. PATENT DOCUMENTS

| | | | | |
|---|---|---|---|---|
| 8,596,827 B2 * | 12/2013 | Phipps | F21V 29/00 | 362/373 |
| 2009/0027888 A1 * | 1/2009 | Yu | F21V 29/76 | 362/373 |
| 2010/0259942 A1 * | 10/2010 | Lee | F21V 29/507 | 362/373 |
| 2011/0309734 A1 * | 12/2011 | Lin | F21V 29/51 | 313/46 |
| 2015/0354776 A1 * | 12/2015 | Lai | F21V 29/51 | 362/487 |

* cited by examiner

*Primary Examiner* — Julie A Bannan
(74) *Attorney, Agent, or Firm* — Jose Cherson Weissbrot

(57) ABSTRACT

Disclosed is a new automobile LED headlamp, including a metal lamp holder, an LED lamp body, a heat sink, heat dissipation fins, and a heat-conducting tube structure. The LED lamp body is provided on both sides of the metal lamp holder and connected with the metal lamp holder by bolts; the heat sink is fixed at one end of the metal lamp holder and is internally provided with an arc-shaped groove; the heat dissipation fins are evenly distributed on an outer wall of the heat sink and fixedly connected with the heat sink; the heat-conducting tube structure is provided on one side of the metal lamp holder; a base is fixed at one side of the heat sink away from the metal lamp holder; and a heat dissipation fan is installed on a surface of the base.

6 Claims, 4 Drawing Sheets

AUTOMOBILE LED HEADLAMP

TECHNICAL FIELD

The present disclosure relates to the technical field of automobile lamps, and in particular, to a new automobile LED headlamp.

BACKGROUND

Automobile LED headlamps generally refer to the front headlights, which are lighting devices installed on both sides of the head of a car for illuminating the road during night driving. The automobile LED headlamps use LED light sources, which not only saves energy, has high luminous efficiency and low energy consumption, but also is environmentally friendly, and meets the current social requirements. As the "eyes" of a car, the automobile LED headlamps not only relate to the external image of a car owner, but also has close relation to the safe driving at night or in bad weather conditions.

The heat dissipation performance of the automobile LED headlamps is one of the important factors affecting their service life. Therefore, heat sinks are usually installed on the automobile LED headlamps to improve the heat dissipation performance of the headlamps. However, the current heat sinks installed on the automobile LED headlamps generally have poor heat conduction and heat dissipation effects. Moreover, the structural design is not reasonable enough and the degree of integration is low, resulting in a relatively large space occupied by the lamp body. Therefore, there is an urgent need for improvement.

SUMMARY

The purpose of the present disclosure is to provide a new automobile LED headlamp to solve the technical problem mentioned in the background.

In order to achieve the above objectives, the present disclosure provides the following technical solutions: a new automobile LED headlamp, which includes a metal lamp holder, an LED lamp body, a heat sink, heat dissipation fins, and a heat-conducting tube structure. The LED lamp body is provided on both sides of the metal lamp holder. The LED lamp body is connected with the metal lamp holder by bolts. The heat sink is fixed at one end of the metal lamp holder and the heat sink is internally provided with an arc-shaped groove. The heat dissipation fins are evenly distributed on an outer wall of the heat sink. The heat dissipation fins are fixedly connected with the heat sink. The heat-conducting tube structure is provided on one side of the metal lamp holder.

Preferably, the heat sink is of an arc-shaped structure, which optimizes the structure of the heat sink.

Preferably, a base is fixed at one side of the heat sink away from the metal lamp holder, which facilitates the installation of a heat dissipation fan.

Preferably, the heat dissipation fan is installed on a surface of the base, which accelerates the air flow to carry away heat.

Preferably, the heat-conducting tube structure includes a straight tube section. The straight tube section is provided on one side of the metal lamp holder, and the straight tube section is fixedly connected with the metal lamp holder, which facilitates heat transfer.

Preferably, the heat-conducting tube structure further includes a curved tube section. The curved tube section is provided on one side of the straight tube section; the curved tube section is integrated with the straight tube section; and one end of the curved tube section away from the straight tube section runs through the arc-shaped groove and is fixedly connected with the heat sink, which facilitates the introduction of heat into the interior of the heat sink.

Compared with the related art, the present disclosure has the following beneficial effects: the new automobile LED headlamp not only enhances the heat conduction and heat dissipation effects, prolongs the service life of the automobile LED headlamp, but also optimizes the heat dissipation structure, and have high degree of integration, compact structure, small space occupation, and strong practicality.

By providing the heat sink, the heat dissipation fins, the base, the heat dissipation fan, and the heat-conducting tube structure, the heat generated during the operation of the LED lamp body is transferred to the straight tube section through the metal lamp holder. The straight tube section then transfers the heat to the curved tube section. The arrangement of the heat dissipation fins increases the heat dissipation area, and the heat dissipation fins are made of an aluminum material and have good heat conduction property. The heat dissipation fan on the surface of the base operates to accelerate the air flow to quickly carry away heat, thereby enhancing the heat conduction and heat dissipation effects, and prolonging the service life of the automobile LED headlamps. Moreover, the automobile LED headlamps optimize the heat dissipation structure, and have high degree of integration, compact structure, small space occupation, and strong practicality.

BRIEF DESCRIPTION OF FIGURES

To describe the technical solutions in embodiments of the present disclosure more clearly, the accompanying drawings required for describing the embodiments are briefly described below. It should be understood that the following accompanying drawings show merely some embodiments of the present disclosure, which therefore should not be construed as limitations on the scope of the present disclosure. For those of ordinary skill in the art, other drawings can be derived from these drawings without creative efforts.

Figure 1:
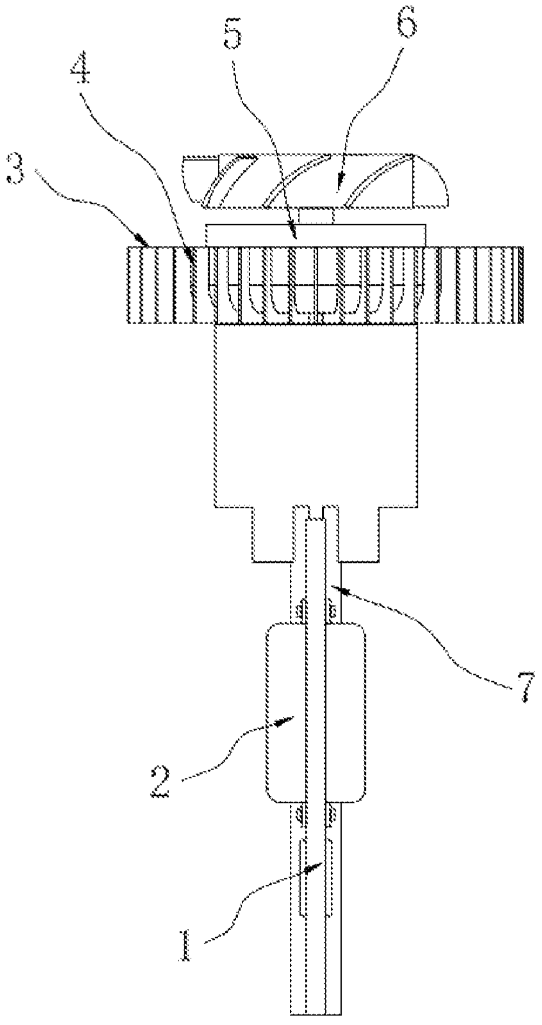
FIG. 1 is a front schematic structural view of the present disclosure.

In the figures: 1, metal lamp holder; 2, LED lamp body; 3, heat sink; 4, heat dissipation fin; 5, base; 6, heat dissipation fan; 7, heat-conducting tube structure; 701, straight tube section; 702, curved tube section; and 8, arc-shaped groove.

DETAILED DESCRIPTION

To make the purpose, technical solution, and advantages of embodiments of the present disclosure clearer, the technical solution in the embodiments of the present disclosure will be described clearly and completely in conjunction with the accompanying drawings. Therefore, the detailed description of the embodiments of the present disclosure provided in the drawings is not intended to limit the scope of protection of the present disclosure, but merely to indicate selected embodiments of the present disclosure. All other embodiments obtained by those of ordinary skill in the art based on the embodiments of the present disclosure without creative efforts shall fall within the scope of protection of the present disclosure.

It should be noted that in the description of the present disclosure, orientation or position relationships indicated by terms such as "center", "up", "down", "vertical", "horizontal", "inside", and "outside" are based on orientation or position relationships illustrated in the accompanying drawings, or the orientation or position relationships under customary placement of the inventive product when in use, and are only intended to facilitate the description of the present disclosure and simplify the description, rather than indicating or implying that the mentioned apparatus or component must have a particular orientation or must be constructed and operated in a particular orientation. Therefore, such terms should not be construed as limitations on the present disclosure. In addition, terms such as "first", "second", and "third" are only used for distinguishing descriptions and should not be construed as indicating or implying relative importance.

Furthermore, terms such as "horizontal" and "vertical" do not mean that the components are required to be absolutely horizontal or overhanging, but can be tilted slightly. For example, "horizontal" only means that the direction is more horizontal relative to "vertical", and does not necessarily mean that the structure must be completely horizontal, but can be slightly tilted.

It should also be noted that in the description of the present disclosure, unless otherwise specified and limited, terms such as "provided", "installed", "connected", and "connection" should be understood in a broad sense. For example, they may be fixed connections, detachable connections, or integral connections; may be directly connected or indirectly connected through an intermediate medium, and may be internal communication between two components. Those of ordinary skill in the art may understand the specific meanings of the foregoing terms in the present disclosure according to specific situations.

The following clearly and completely describes the technical solutions in the embodiments of the present disclosure with reference to the accompanying drawings in the embodiments of the present disclosure. All other embodiments obtained by those of ordinary skill in the art based on the embodiments of the present disclosure without creative efforts shall fall within the scope of protection of the present disclosure.

Figure 2:
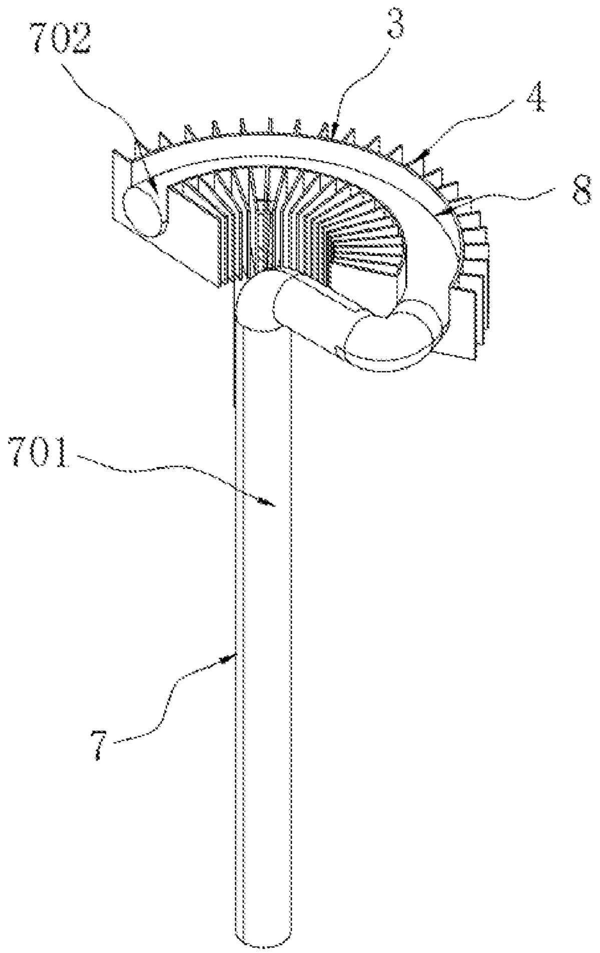
FIG. 2 is a schematic three-dimensional structure view of a heat-conducting tube structure according to the present disclosure.
Figure 3:
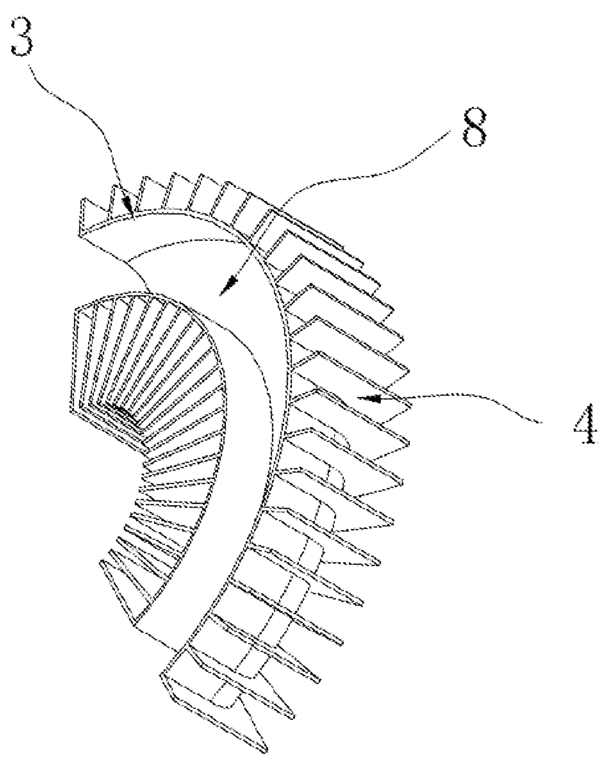
FIG. 3 is a schematic three-dimensional structure view of a heat sink according to the present disclosure.
Figure 4:
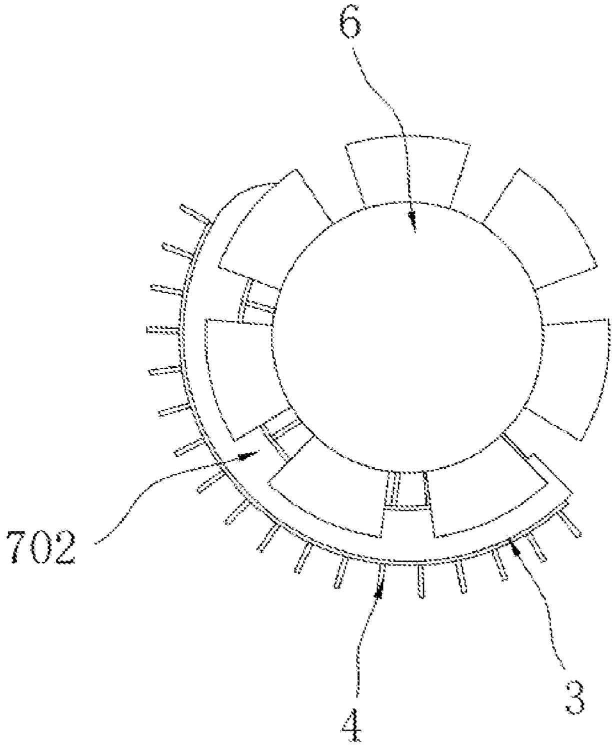
FIG. 4 is a side schematic structural view of the present disclosure.

Referring to FIGS. 1-4, an embodiment, namely a new automobile LED headlamp, provided by the present disclosure includes a metal lamp holder 1, an LED lamp body 2, a heat sink 3, heat dissipation fins 4, and a heat-conducting tube structure 7. The LED lamp body 2 is provided on both sides of the metal lamp holder 1, and the LED lamp body 2 is connected with the metal lamp holder 1 by bolts.

The heat sink 3 is fixed at one end of the metal lamp holder 1, and the heat sink 3 is internally provided with an arc-shaped groove 8. The heat dissipation fins 4 are evenly distributed on an outer wall of the heat sink 3, and the heat dissipation fins 4 are fixedly connected with the heat sink 3.

The heat-conducting tube structure 7 is provided on one side of the metal lamp holder 1.

The heat sink 3 is of an arc-shaped structure, which optimizes the structure of the heat sink 3.

A base 5 is fixed at one side of the heat sink 3 away from the metal lamp holder 1, which facilitates the installation of a heat dissipation fan 6.

The heat dissipation fan 6 is installed on a surface of the base 5, which accelerates the air flow to carry away heat.

The heat-conducting tube structure 7 includes a straight tube section 701. The straight tube section 701 is provided on one side of the metal lamp holder 1, and the straight tube section 701 is fixedly connected with the metal lamp holder 1, which facilitates heat transfer.

The heat-conducting tube structure 7 further includes a curved tube section 702. The curved tube section 702 is provided on one side of the straight tube section 701; the curved tube section 702 is integrated with the straight tube section 701; and one end of the curved tube section 702 away from the straight tube section 701 runs through the arc-shaped groove 8 and is fixedly connected with the heat sink 3, which facilitates the introduction of heat into the interior of the heat sink 3.

When this embodiment of the present disclosure is implemented, the LED lamp body 2 is installed on both sides of the metal lamp holder 1, and the heat sink 3, the heat dissipation fins 4, the base 5, the heat dissipation fan 6, and the heat-conducting tube structure 7 constitute an air-cooled heat dissipation system. The straight tube section 701 of the heat-conducting tube structure 7 is fixed at one side of the metal lamp holder 1. The curved tube section 702 is fixed in the arc-shaped groove 8 inside the heat sink 3. The heat generated during the operation of the LED lamp body 2 is transferred to the straight tube section 701 through the metal lamp holder 1. The straight tube section 701 then transfers the heat to the curved tube section 702. The arrangement of heat dissipation fins 4 increases the heat dissipation area, and the heat dissipation fins 4 are made of an aluminum material and have heat conduction effect. In addition, the heat dissipation fan 6 on the surface of the base 5 operates to accelerate the air flow to quickly carry away heat, thereby enhancing the heat conduction and heat dissipation effects, and prolonging the service life of the automobile LED headlamps. Moreover, the automobile LED headlamps optimize the heat dissipation structure, and have high degree of integration, compact structure, small space occupation, and strong practicality.

Obviously, the embodiments described above are merely a part of the embodiments of the present disclosure, not all of the embodiments. All other embodiments obtained by those of ordinary skill in the art based on the embodiments of the present disclosure without creative efforts shall fall within the scope of protection of the present disclosure.

It should be noted that the terms used herein are merely used for describing specific implementations, and are not intended to limit exemplary implementations of the present disclosure. As used herein, unless otherwise explicitly specified in the context, the singular form is also intended to include the plural form. In addition, it also should be understood that terms "include/including" and/or "comprise/comprising" used in this description indicate the presence of features, steps, operations, devices, components, and/or combinations thereof.

It should be noted that terms such as "first" and "second" in the description and claims of the present disclosure and in the above accompanying drawings are used for distinguishing similar objects but not necessarily used for describing any particular order or sequence. It is to be understood that such used data is interchangeable where appropriate, so that the embodiments of the present disclosure described here can be implemented in an order besides those illustrated or described here.

What is claimed is:

1. A new automobile LED headlamp, comprising a metal lamp holder (1), an LED lamp body (2), a heat sink (3), heat dissipation fins (4), and a heat-conducting tube structure (7), wherein the LED lamp body (2) is provided on both sides of the metal lamp holder (1), the LED lamp body (2) is connected with the metal lamp holder (1) by bolts, the heat sink (3) is fixed at one end of the metal lamp holder (1) and the heat sink (3) is internally provided with an arc-shaped groove (8), the heat dissipation fins (4) are evenly distributed on an outer wall of the heat sink (3), the arc-shaped groove (8) is positioned between the heat dissipation fins (4), the heat dissipation fins (4) are fixedly connected with the heat sink (3), and the heat-conducting tube structure (7) is provided on one side of the metal lamp holder (1).

2. The new automobile LED headlamp according to claim 1, wherein the heat sink (3) is of an arc-shaped structure.

3. The new automobile LED headlamp according to claim 1, wherein a base (5) is fixed at one side of the heat sink (3) away from the metal lamp holder (1).

4. The new automobile LED headlamp according to claim 3, wherein a heat dissipation fan (6) is installed on a surface of the base (5).

5. The new automobile LED headlamp according to claim 1, wherein the heat-conducting tube structure (7) comprises a straight tube section (701), the straight tube section (701) is provided on one side of the metal lamp holder (1), and straight tube section (701) is fixedly connected with the metal lamp holder (1).

6. The new automobile LED headlamp according to claim 5, wherein the heat-conducting tube structure (7) further comprises a curved tube section (702), the curved tube section (702) is provided on one side of the straight tube section (701), the curved tube section (702) is integrated with the straight tube section (701), and one end of the curved tube section (702) away from the straight tube section (701) runs through the arc-shaped groove (8) and is fixedly connected with the heat sink (3).

* * * * *